3,086,973
PYRAZINE-METAL SALT COMPLEXES
Ronald Sydney Nyholm, Hurchleywood Esher, Surrey, England, assignor to Wyandotte Chemicals Corporation, Wyandotte, Mich., a corporation of Michigan
No Drawing. Filed Dec. 13, 1960, Ser. No. 75,483
6 Claims. (Cl. 260—242)

This invention relates to new pyrazine-metal salt complexes. In a more specific aspect, this invention relates to complexes of pyrazine or methylpyrazines with salts of copper, nickel or cobalt.

Pyrazine compounds have two potential donor nitrogen atoms; however, pyrazine compounds are weak bases and the second nitrogen atom in pyrazines does not enter into quaternization reactions. New semi-organic polymers could be prepared if the relative donor capacities of the two nitrogen atoms in pyrazine compounds is sufficient upon which to join with or complex metal salts.

It is an object of this invention, therefore, to produce new complexes of pyrazines and metal salts.

A further object is to provide new organometallic complexes which can be the basis for new semi-inorganic polymers.

I have discovered that solid complexes can be produced by the interaction of pyrazine or carbon-substituted methylpyrazines with salts of copper, nickel or cobalt. The metal salts can be halides or cyanides and the pyrazine compounds can be pyrazine, methylpyrazine, 2,5-dimethylpyrazine, 2,6-dimethylpyrazine, 2,3,5,6-tetramethylpyrazine, and the like. The new complexes are colored, solid products and they all, except the complexes with cuprous salts, are soluble to varying extents in water. The cuprous salt complexes are soluble in hydrochloric acid and hydrobromic acid but are insoluble in other solvents. The cobalt chloride and bromide complexes are soluble in acetone and alcohol and are hygroscopic. The nickel complexes are slightly soluble in alcohol and most of the complexes are thermally unstable, losing the pyrazine component at above 100° C. at 15 millimeters of mercury pressure.

The specific structure of these complexes is not known. However, the composition of the complexes has been establishes by elemental analyses. The complexes of pyrazines with cuprous and cupric salts contain two salt groups for each pyrazine nucleus and these complexes are believed to be the first such complexes to have been produced in which each nitrogen atom is bound to a metal atom.

Although the specific structure of the complexes is not known, the new complexes of the invention can be represented by the following formula which is in accord with the results of the analyses that have been carried out on the products described in the examples to follow:

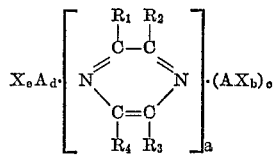

$R_1$, $R_2$, $R_3$ and $R_4$ can be hydrogen or methyl radicals. A can be copper, nickel or cobalt. X can be chlorine, bromine, iodine or a cyano radical. The number of pyrazine molecules bound into the complex is represented by $a$ which can be from 1 to 4, inclusive. The number of halogens or cyano groups is represented by $b$ and $e$; $b$ can be 1–2, inclusive, and $e$ can be 0–1, inclusive. When A is copper, $d$ and $e$ are 1 since the complexes with copper salts contain salt groups attached to each nitrogen atom of the pyrazine nucleus. Thus, when A is copper, $a$, $b$, $c$, $d$ and $e$ all are 1. When A is nickel, $d$ and $e$ are 0 and when A is cobalt, $d$ and $e$ are 0.

The most important use for the new complexes is for the preparation of semi-organic (metal-ligand-metal) polymers. Other uses include trace metal additions in agricultural applications and catalysis where the nitrogen-bonded metals are of special value. The copper salt complexes are believed to be specially unique since they represent the first composition involving the pyrazine molecule in which both nitrogen atoms are bound. The property of thermal instability of the pyrazine-metal salt complexes can be used to advantage in providing a means for controllably releasing the metal from the complex at a definite temperature to permit the catalytic effect of the metal to be employed. Polymers can be prepared from the complexes, for example, by condensing the complex with a diamine involving the release of a halogen acid, to thus provide a source of metal that can be released to exert its beneficial effect. Release of copper from such complexes or polymers of the complexes can lead to uses of the complexes in coating compositions, such as marine paints, where the metal is of special value.

The pyrazine-metal salt complexes are illustrated further by the following examples.

*Example 1.*—ClCu(*Methylpyrazine*)CuCl

Methylpyrazine and cupric chloride dihydrate were dissolved in water in 2:1 molar proportions, cupric chloride to methylpyrazine. Hypophosphorous acid (10 ml.; 31%) was then added and the mixture was maintained at 90° C. for 30 minutes.

Orange crystals formed rapidly in the hot solution which was then cooled and filtered. The crystals were dissolved in the minimum quantity of concentrated hydrochloric acid and filtered through sintered glass. Cold water was then added to the acid solution drop by drop until reprecipitation of the orange, solid complex was complete. The product was filtered, washed with water, alcohol and ether and dried at 60° C. and 15 millimeters mercury pressure.

Elemental analysis for $C_5H_6N_2Cu_2Cl_2$ and the actual elemental analysis of the complex are given below.

| | Theoretical, percent | Found, percent |
|---|---|---|
| C | 20.6 | 21.2 |
| H | 2.1 | 2.1 |
| N | 9.6 | 10.1 |
| Cu | 43.5 | 44.0 |
| Cl | 24.3 | 24.4 |

*Example 2.*—ClCu(*2,5-Dimethylpyrazine*)CuCl

The procedure described in Example 1 was repeated using 2,5-dimethylpyrazine instead of methylpyrazine.

A solid, crystalline complex was again obtained. The elemental analysis for nitrogen, copper and chlorine in $C_6H_8N_2Cu_2Cl_2$ and the actual elemental analysis for these elements in the complex are given below.

| | Theoretical, percent | Found, percent |
|---|---|---|
| N | 9.15 | 9.2 |
| Cu | 41.5 | 41.5 |
| Cl | 23.2 | 23.05 |

*Example 3.*—BrCu(*2,5-Dimethylpyrazine*)CuBr

The procedure of Example 2 was repeated except that concentrated hydrobromic acid, instead of concentrated hydrochloric acid, was used for recrystallization of the solid complex. An orange crystalline complex was again produced. The magnetic moment of the complex, measured in Bohr Magnetons, was 0.0.

The elemental analysis for nitrogen, copper and bromine in $C_6H_8Cu_2Br_2$ and the actual elemental analysis for these elements in the complex are given below.

|   | Theoretical, percent | Found, percent |
|---|---|---|
| N | 7.1 | 7.0 |
| Cu | 32.2 | 32.1 |
| Br | 40.5 | 40.8 |

*Example 4.*—$BrCu(2,6\text{-}Dimethylpyrazine)CuBr$

The procedure of Example 3 was repeated using 2,6-dimethylpyrazine.

A solid, crystalline complex was obtained. The elemental analysis for carbon, hydrogen, nitrogen and copper in $C_6H_8N_2Cu_2Br_2$ and the actual elemental analysis for these elements in the complex are given below.

|   | Theoretical, percent | Found, percent |
|---|---|---|
| C | 22.7 | 22.7 |
| H | 2.9 | 2.9 |
| N | 6.6 | 6.6 |
| Cu | 30.0 | 29.7 |

*Example 5.*—$BrCu(2,3,5,6\text{-}Tetramethylpyrazine)CuBr$

Cupric bromide and 2,3,5,6-*tetramethylpyrazine* were refluxed in ethanol for six hours. A yellow crystalline complex was produced which was recrystallized from hydrobromic acid.

An elemental analysis for carbon, hydrogen, nitrogen and copper in the complex, BrCu(2,3,5,6-tetramethylpyrazine)CuBr, having the empirical formula $$C_8H_{12}N_2Cu_2Br_2$$

was carried out and the results are given below.

|   | Theoretical, percent | Found, percent |
|---|---|---|
| C | 22.7 | 22.7 |
| H | 2.9 | 2.9 |
| N | 6.6 | 6.6 |
| Cu | 30.0 | 29.7 |

*Example 6.*—$ClCu(2,6\text{-}Dimethylpyrazine)CuCl$

Cuprous chloride dissolved in concentrated hydrochloric acid was added to 2,6-dimethylpyrazine dissolved in concentrated hydrochloric acid. The molar proportions used were 2:1, cuprous chloride to 2,6-dimethylpyrazine. An intense red solution resulted which was filtered and water was added, drop by drop, until precipitation ceased.

An orange crystalline powder complex was obtained which was recrystallized from hydrochloric acid. The magnetic moment of the complex, measured in Bohr Magnetons, was 0.0.

The elemental analysis for $C_6H_8N_2Cu_2Cl_2$ and the actual elemental analysis for the complex are given below.

|   | Theoretical, percent | Found, percent |
|---|---|---|
| C | 23.5 | 23.3 |
| H | 2.6 | 2.9 |
| N | 9.15 | 9.2 |
| Cu | 41.5 | 41.7 |
| Cl | 23.2 | 23.0 |

*Example 7.*—$(CN)Cu(Methylpyrazine)Cu(CN)$

Methylpyrazine, potassium cyanide, and hydroxylamine hydrochloride were dissolved in water in molar proportions of 1:4, methylpyrazine to potassium cyanide.

A solution of cupric chloride dihydrate in water was added slowly with stirring in the molar proportion of 2:1, copper salt to pyrazine. The solution was then boiled gently for 30 minutes. A green cupric complex was formed, initially, which rapidly converted to a yellow solid complex upon warming. The product was washed with water and dried at 50° C. and 15 millimeters of mercury pressure. The magnetic moment of the complex, measured in Bohr Magnetons, was 0.0.

The elemental analysis for $C_7H_6N_4Cu_2$ and the actual elemental analysis for the complex are given below.

|   | Theoretical, percent | Found, percent |
|---|---|---|
| C | 30.8 | 31.5 |
| H | 2.2 | 2.7 |
| N | 20.5 | 20.2 |
| Cu | 46.5 | 46.5 |

*Example 8.*—$(CN)Cu(2,5\text{-}Dimethylpyrazine)Cu(CN)$

The procedure of Example 7 was repeated using 2,5-dimethylpyrazine instead of methylpyrazine.

A solid complex was obtained. The elemental analysis for $C_8H_8N_4Cu_2$ and the actual elemental analysis for the complex are given below.

|   | Theoretical, percent | Found, percent |
|---|---|---|
| C | 33.5 | 34.1 |
| H | 2.8 | 3.3 |
| N | 19.5 | 19.9 |
| Cu | 44.2 | 44.5 |

*Example 9.*—$(CN)Cu(2,3,5,6\text{-}Tetramethylpyrazine)Cu(CN)$

The procedure of Example 7 was repeated using 2,3,5,6-tetramethylpyrazine instead of methylpyrazine. A yellow solid complex was obtained. The magnetic moment of the complex, measured in Bohr Magnetons, was 0.0. The elemental analysis for $C_{10}H_{12}N_4Cu_2$ and the actual elemental analysis for the complex are given below.

|   | Theoretical, percent | Found, percent |
|---|---|---|
| C | 38.1 | 38.2 |
| H | 3.8 | 4.3 |
| N | 17.8 | 18.1 |
| Cu | 40.3 | 40.6 |

*Example 10.*—$(CN)Cu(Pyrazine)Cu(CN)$

The procedure of Example 7 was repeated using pyrazine instead of methylpyrazine. A solid complex was obtained.

The elemental analysis for $C_6H_4N_4Cu_2$ and the actual elemental analysis for the complex are given below.

|   | Theoretical, percent | Found, percent |
|---|---|---|
| C | 27.8 | 28.4 |
| H | 1.55 | 1.9 |
| N | 21.6 | 22.0 |
| Cu | 49.0 | 49.7 |

*Example 11.*—$ICu(Pyrazine)CuI$

Pyrazine and sodium iodide dissolved in water were added to a solution of cupric chloride dihydrate in water in the molar proportions of 1:4:2.2, pyrazine to iodide to chloride. After standing for 30 minutes, the resulting yellow-brown precipitate was filtered, washed with water, alcohol and ether and dried at 120° C. at 15 millimeters of mercury pressure. The magnetic moment of the complex, measured in Bohr Magnetons, was 0.0.

The elemental analysis for carbon, hydrogen, nitrogen and copper in $C_4H_4N_2Cu_2I_2$ and the actual elemental analysis for these elements in the complex are given below.

|    | Theoretical, percent | Found, percent |
|----|---------------------|----------------|
| C  | 10.4                | 10.55          |
| H  | 0.9                 | 1.3            |
| N  | 6.1                 | 5.7            |
| Cu | 27.6                | 27.8           |

*Example 12.—(2,6-Dimethylpyrazine)$_2$NiCl$_2$*

Nickel chloride was mixed with 2,6-dimethylpyrazine in the molar proportions of 2:1, pyrazine to nickel salt, at 100° C. for 15 minutes. A solid complex precipitated which was purified by repeated Soxhlet extraction with alcohol. The complex was dissolved in aqueous ammonia and recrystallized by acidification.

The elemental analysis for $C_{12}H_{16}N_4NiCl_2$ and the actual elemental analysis for the complex are given below.

|    | Theoretical, percent | Found, percent |
|----|---------------------|----------------|
| C  | 41.7                | 42.4           |
| H  | 4.1                 | 5.4            |
| N  | 16.2                | 15.9           |
| Ni | 17.0                | 17.0           |
| Cl | 20.5                | 20.4           |

*Example 13.—(2,5-Dimethylpyrazine)NiBr$_2$*

The procedure of Example 12 was repeated using 1:1 molar proportions of 2,5-dimethylpyrazine and nickel bromide. An intensely purple solid complex was obtained.

The elemental analysis for $C_6H_8N_2NiBr_2$ and the actual elemental analysis for the complex are given below.

|    | Theoretical, percent | Found, percent |
|----|---------------------|----------------|
| C  | 22.1                | 22.6           |
| H  | 2.5                 | 2.8            |
| N  | 8.6                 | 9.4            |
| Ni | 18.0                | 17.6           |
| Br | 48.9                | 48.2           |

*Example 14.—(Methylpyrazine)$_4$NiCl$_2$*

The procedure of Example 12 was repeated using 4:1 molar proportions of a mixture of methylpyrazine and nickel chloride.

A pale green solid complex was obtained having the composition, (methylpyrazine)$_4$NiCl$_2$. The magnetic moment of the complex in Bohr Magnetons was 3.31.

*Example 15.—(2,5-Dimethylpyrazine)NiCl$_2$*

The procedure of Example 12 was repeated using 1:1 molar proportions of 2,5-dimethylpyrazine and nickel chloride.

A green-white, isomorphous, solid complex was obtained having the composition, (2,5-dimethylpyrazine) NiCl$_2$. The magnetic moment of the complex in Bohr Magnetons was 3.58.

*Example 16.—(2,6-Dimethylpyrazine)$_2$NiBr$_2$*

The procedure of Example 13 was repeated using 2:1 molar proportions of 2,6-dimethylpyrazine and nickel bromide.

A yellow-white solid complex was obtained having the composition, (2,6-dimethylpyrazine)$_2$NiBr$_2$. The magnetic moment of the complex in Bohr Magnetons was 3.35.

*Example 17.—(Methylpyrazine)NiBr$_2$*

The procedure of Example 13 was repeated using 1:1 molar proportions of methylpyrazine and nickel bromide.

A green-white solid complex was obtained having the composition, (methylpyrazine)NiBr$_2$. The magnetic moment of the complex in Bohr Magnetons was 3.40.

*Example 18.—(Pyrazine)$_2$NiI$_2$*

Pyrazine and nickel iodide were mixed in 1:1 molar proportions. The solid complex which precipitated was purified and recrystallized.

The complex, having the composition of (pyrazine)$_2$NiI$_2$, was yellow in color and had a magnetic moment in Bohr Magnetons of 3.23.

*Example 19.—(Pyrazine)$_2$CoCl$_2$*

Cobalt chloride hexahydrate dissolved in hot water was added to pyrazine dissolved in hot water in 2:1 molar proportions of pyrazine to cobalt salt. After standing for 30 minutes, the solid precipitate was filtered, washed with cold water, then with ethanol and ether and dried in a vacuum desiccator.

A pink, crystalline complex was obtained having the composition, (pyrazine)$_2$CoCl$_2$. The elemental analysis for $C_8H_8N_4CoCl_2$ and the actual elemental analysis for the complex are given below.

|    | Theoretical, percent | Found, percent |
|----|---------------------|----------------|
| C  | 33.1                | 33.7           |
| H  | 2.8                 | 3.5            |
| N  | 19.3                | 19.2           |
| Co | 20.3                | 20.6           |
| Cl | 24.5                | 24.5           |

*Example 20.—(Pyrazine)$_2$CoBr$_2$*

The procedure of Example 19 was repeated using cobalt bromide hexahydrate instead of cobalt chloride hexahydrate.

A pink, crystalline complex was obtained having the composition, (pyrazine)$_2$CoBr$_2$. The elemental analysis for $C_8H_8N_4CoBr_2$ and the actual elemental analysis for the complex are given below.

|    | Theoretical, percent | Found, percent |
|----|---------------------|----------------|
| C  | 25.4                | 26.1           |
| H  | 2.1                 | 2.4            |
| N  | 14.8                | 14.85          |
| Co | 15.55               | 15.3           |
| Br | 42.2                | 42.2           |

*Example 21.—(Pyrazine)$_2$CoI$_2$*

Cobalt bromide hexahydrate was dissolved in hot water and added to a mixture of pyrazine and sodium iodide dissolved in hot water in the molar proportions of 2:1, pyrazine to cobalt salt. The solid complex which resulted was filtered and recrystallized from water to produce yellowish red crystals which were dried in a vacuum desiccator. The complex obtained had the composition, (pyrazine)$_2$CoI$_2$.

The elemental analysis for cobalt, nitrogen and iodine in $C_8H_8N_4CoI_2$ and the actual elemental analysis for these elements in the complex are given below.

|    | Theoretical, percent | Found, percent |
|----|---------------------|----------------|
| Co | 12.5                | 13.2           |
| N  | 11.9                | 12.4           |
| I  | 53.7                | 53.9           |

*Example 22.—(Methylpyrazine)$_4$CoCl$_2$*

Cobalt chloride hexahydrate was recrystallized three times from methylpyrazine. The hot, intense blue solution turned pink on cooling and deposited large pink crystals of (methylpyrazine)$_4$CoCl$_2$ complex. The complex was washed with petroleum ether and dried over concentrated sulfuric acid.

The elemental analysis for carbon, hydrogen, cobalt and chlorine in $C_{20}H_{24}N_8CoCl_2$ and the actual elemental analysis for these elements in the complex are given below.

|    | Theoretical, percent | Found, percent |
|----|----------------------|----------------|
| C  | 47.45                | 47.6           |
| H  | 4.7                  | 5.2            |
| Co | 11.6                 | 11.6           |
| Cl | 14.0                 | 14.4           |

*Example 23.—(Methylpyrazine)$CoCl_2$*

The complex produced in Example 22 was heated to 50° C. at 15 millimeters of mercury pressure and then washed with ethanol. A complex having the composition, (methylpyrazine)$CoCl_2$, was obtained.

This complex was also obtained by mixing cobalt chloride hexahydrate in 1:1 molar proportions at 100° C. for 30 minutes. The solid product was Soxhlet extracted twice with acetone and the resulting pale pink complex having the composition, (methylpyrazine)$CoCl_2$ was dried at 50° C. and 15 millimeters of mercury pressure.

The elemental analysis for carbon, hydrogen, cobalt and chlorine in $C_5H_6N_2CoCl_2$ and the actual elemental analysis for these elements in the complex are given below.

|    | Theoretical, percent | Found, percent |
|----|----------------------|----------------|
| C  | 26.8                 | 27.4           |
| H  | 2.7                  | 3.4            |
| Co | 26.3                 | 25.8           |
| Cl | 31.7                 | 31.1           |

*Example 24.—(Methylpyrazine)$CoBr_2$*

Cobalt bromide hexahydrate was recrystallized twice from methylpyrazine and the resulting pink crystals were heated at 80° C. and 15 millimeters of mercury pressure. A blue complex product having the composition, (methylpyrazine)$CoBr_2$, was obtained. The complex had a magnetic moment in Bohr Magnetons of 4.71.

The elemental analysis for nitrogen, cobalt and bromine in $C_5H_6N_2CoBr_2$ and the actual elemental analysis for these elements in the complex are given below.

|    | Theoretical, percent | Found, percent |
|----|----------------------|----------------|
| N  | 9.0                  | 9.4            |
| Co | 18.8                 | 18.6           |
| Br | 51.1                 | 50.7           |

*Example 25.—(Methylpyrazine)$CoI_2$*

The (methylpyrazine)$CoBr_2$ complex produced in Example 24 was dissolved in ethanol and refluxed gently with a large excess of sodium iodide for 30 minutes. The solvent was removed and the green product having the composition, (methylpyrazine)$CoI_2$, was Soxhlet extracted three times with sodium-dried ether.

The elemental analysis for $C_5H_6N_2CoI_2$ and the actual elemental analysis for the complex are given below.

|    | Theoretical, percent | Found, percent |
|----|----------------------|----------------|
| C  | 14.8                 | 14.7           |
| H  | 1.5                  | 1.7            |
| N  | 6.9                  | 7.0            |
| Co | 14.5                 | 13.9           |
| I  | 62.4                 | 62.2           |

The formula weight of the complex is 406.9 and the molecular weight of the complex was determined in camphor by Rast's Method to be 840.

*Example 26.—(2,5-Dimethylpyrazine)$_3$(CoCl$_2$)$_2$*

Cobalt chloride hexahydrate was recrystallized twice from 2,5-dimethylpyrazine. Large azure-blue crystals were produced having the composition, (2,5-methylpyrazine)$_3$(CoCl$_2$)$_2$, and were washed with ether and dried in a desiccator.

The elemental analysis for nitrogen, cobalt and chlorine in $C_{18}H_{24}N_6Co_2Cl_4$ and the actual elemental analysis for these elements in the complex are given below.

|    | Theoretical, percent | Found, percent |
|----|----------------------|----------------|
| N  | 14.3                 | 13.8           |
| Co | 20.2                 | 19.7           |
| Cl | 24.3                 | 24.2           |

*Example 27.—(2,5-Dimethylpyrazine)$CoCl_2$*

The (2,5-dimethylpyrazine)$_3$(CoCl$_2$)$_2$ complex produced in Example 26 was Soxhlet extracted twice with acetone to produce a pale pink isomorphous complex having the composition, (2,5-dimethylpyrazine)$CoCl_2$.

The elemental analysis for $C_6H_8N_2CoCl_2$ and the actual elemental analysis for the complex are given below.

|    | Theoretical, percent | Found, percent |
|----|----------------------|----------------|
| C  | 30.3                 | 30.9           |
| H  | 3.4                  | 3.9            |
| N  | 11.8                 | 11.6           |
| Co | 24.75                | 24.5           |
| Cl | 29.8                 | 29.6           |

The complex had a magnetic moment in Bohr Magnetons of 5.53.

*Example 28.—(2,5-Dimethylpyrazine)$CoBr_2$*

Cobalt bromide hexahydrate was recrystallized twice from 2,5-dimethylpyrazine. A blue crystalline complex having the composition, (2,5-dimethylpyrazine)$CoBr_2$, was produced and was washed with ether and dried in a desiccator.

The elemental analysis for carbon, hydrogen, cobalt and bromine in $C_6H_8N_2CoBr_2$ and the actual elemental analysis for these elements in the complex are given below.

|    | Theoretical, percent | Found, percent |
|----|----------------------|----------------|
| C  | 22.1                 | 22.6           |
| H  | 2.5                  | 2.8            |
| Co | 18.0                 | 17.8           |
| Br | 48.9                 | 49.6           |

The molecular weight of the complex was found to be 672 by a cryoscopic method in 2,5-dimethylpyrazine. The formula weight of the complex is 326.9. The complex is dimeric in 2,5-dimethylpyrazine and is a nonelectrolyte in acetone. The magnetic moment of the complex in Bohr Magnetons was 4.68.

*Example 29.—(2,5-Dimethylpyrazine)$CoI_2$*

The procedure of Example 25 was repeated using the complex (2,5-dimethylpyrazine)$CoBr_2$ of Example 28 instead of the complex (methylpyrazine)$CoBr_2$ of Example 24. A complex having the composition, (2,5-dimethylpyrazine)$CoI_2$, was produced.

The elemental analysis for $C_6H_8N_2CoI_2$ and the actual elemental analysis for the complex are given below.

|    | Theoretical, percent | Found, percent |
|----|----------------------|----------------|
| C  | 17.1                 | 17.25          |
| H  | 1.9                  | 2.3            |
| N  | 6.7                  | 6.75           |
| Co | 14.0                 | 13.4           |
| I  | 60.3                 | 60.0           |

The molecular weight of the complex was found to be 860 by a cryoscopic method in 2,5-dimethylpyrazine. The formula weight of the complex is 420.7.

*Example 30.—(2,6-Dimethylpyrazine)$_2$CoCl$_2$*

Stoichiometric proportions of cobalt chloride hexahydrate and 2,6-dimethylpyrazine were heated at 100° C. for 15 minutes. The solid complex product having the composition, (2,6-dimethylpyrazine)$_2$CoCl$_2$, was purified by double recrystallization from acetone in which it was sparingly soluble.

The elemental analysis for $C_{12}H_{16}N_4CoCl_2$ and the actual elemental analysis for the complex are given below.

|    | Theoretical, percent | Found, percent |
|----|---------------------|----------------|
| C  | 41.6                | 41.9           |
| H  | 4.7                 | 5.1            |
| N  | 16.2                | 16.1           |
| Co | 17.0                | 16.8           |
| Cl | 20.5                | 20.2           |

The molecular weight of the complex was found to be 351 by an ebullioscopic method in acetone. The formula weight of the complex is 345.9.

*Example 31.—(2,6-Dimethylpyrazine)$_2$CoBr$_2$*

The procedure of Example 30 was repeated using cobalt bromide hexahydrate instead of cobalt chloride hexahydrate. A violet-pink crystalline complex having the composition, (2,6-dimethylpyrazine)$_2$CoBr$_2$, was produced.

The elemental analysis for $C_{12}H_{16}N_4CoBr_2$ and the actual elemental analysis for the complex are given below.

|    | Theoretical, percent | Found, percent |
|----|---------------------|----------------|
| C  | 33.1                | 33.1           |
| H  | 3.7                 | 4.1            |
| N  | 12.9                | 13.0           |
| Co | 13.5                | 12.9           |
| Br | 36.7                | 36.8           |

The magnetic moment of the complex in Bohr Magnetons is 5.37.

*Example 32.—(2,6-Dimethylpyrazine)$_2$CoI$_2$*

The procedure of Example 25 was repeated using the complex, (2,6-dimethylpyrazine)$_2$CoBr$_2$, of Example 31 instead of the (methylpyrazine)CoBr$_2$ complex of Example 24. A deep green complex having the composition, (2,6-dimethylpyrazine)$_2$CoI$_2$, was produced.

The elemental analysis for $C_{12}H_{16}N_4CoI_2$ and the actual elemental analysis for the complex are given below.

|    | Theoretical, percent | Found, percent |
|----|---------------------|----------------|
| C  | 27.2                | 27.8           |
| H  | 3.0                 | 3.4            |
| N  | 10.6                | 10.2           |
| Co | 11.1                | 11.0           |
| I  | 48.0                | 48.2           |

The complex was monomeric in camphor and was a non-electrolyte in acetone and nitromethane. The molecular weight of the complex was found to be 490 in camphor. The formula weight of the complex is 529.

I claim:

1. A pyrazine-metal salt complex having the composition

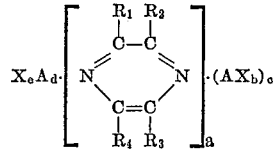

wherein $R_1$, $R_2$, $R_3$ and $R_4$ are members selected from the group consisting of hydrogen and methyl radicals, wherein A is a metal selected from the group consisting of copper, nickel and cobalt, wherein X is a member selected from the group consisting of chlorine, bromine, iodine and cyano radical, wherein $a$ is an integer in the range from 1–4, inclusive, wherein $b$ is an integer in the range from 1–2, inclusive, wherein $c$ is an integer in the range from 1–2, inclusive, wherein $d$ is in the range from 0–1, inclusive, and wherein $e$ is in the range from 0–1, inclusive; the further conditions being that when A is copper, $a$, $b$, $c$, $d$ and $e$ are 1, when A is nickel, $d$ and $e$ are 0, and when A is cobalt, $d$ and $e$ are 0.

2. A pyrazine metal salt complex of the formula ClCu(2,6-dimethylpyrazine)CuCl.

3. A pyrazine metal salt complex of the formula ICu(pyrazine)CuI.

4. A pyrazine metal salt complex of the formula (2,5-dimethylpyrazine)NiBr$_2$.

5. A pyrazine-metal salt complex of the formula (CN)Cu(2,5-dimethylpyrazine)Cu(CN).

6. A pyrazine-metal salt complex of the formula (2,6-dimethylpyrazine)$_2$NiCl$_2$.

No references cited.